(12) United States Patent
Ellul et al.

(10) Patent No.: US 9,200,158 B2
(45) Date of Patent: Dec. 1, 2015

(54) ELASTOMERIC COMPOSITIONS AND THEIR USE IN ARTICLES

(71) Applicant: ExxonMobil Chemical Patents Inc., Baytown, TX (US)

(72) Inventors: Maria D. Ellul, Silver Lake Village, OH (US); Ronald De Young, Westfield Center, OH (US); Dennis Kumor, Copley, OH (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 14/356,339

(22) PCT Filed: Nov. 12, 2012

(86) PCT No.: PCT/US2012/064645
§ 371 (c)(1),
(2) Date: May 5, 2014

(87) PCT Pub. No.: WO2013/095807
PCT Pub. Date: Jun. 27, 2013

(65) Prior Publication Data
US 2014/0309371 A1 Oct. 16, 2014

Related U.S. Application Data

(60) Provisional application No. 61/577,409, filed on Dec. 19, 2011.

(51) Int. Cl.
*C08L 21/00* (2006.01)
*C08L 23/00* (2006.01)
*C08L 53/00* (2006.01)
*C08L 77/00* (2006.01)
*C08L 77/06* (2006.01)
*C08L 23/02* (2006.01)
*C08L 23/22* (2006.01)
*C08L 23/28* (2006.01)
*C08L 25/08* (2006.01)

(52) U.S. Cl.
CPC ........... *C08L 77/06* (2013.01); *C08L 23/02* (2013.01); *C08L 23/22* (2013.01); *C08L 23/283* (2013.01); *C08L 25/08* (2013.01)

(58) Field of Classification Search
None
See application file for complete search history.

(56) References Cited

U.S. PATENT DOCUMENTS 8,071,220 B2 * 12/2011 Abraham et al. .......... 428/476.3
8,809,455 B2    8/2014 Ellul et al.

FOREIGN PATENT DOCUMENTS

| EP | 0 722 850 | 7/1996 |
| EP | 0 969 039 | 1/2000 |
| EP | 2011/025593 | * 3/2011 |
| JP | 2009/513774 | 4/2009 |
| JP | 2011-021146 | 2/2011 |
| WO | WO 94/12575 | 6/1994 |
| WO | WO 2007/070063 | 6/2007 |
| WO | WO 2011/025593 | 3/2011 |

* cited by examiner

*Primary Examiner* — Ana Woodward
(74) *Attorney, Agent, or Firm* — Nancy T. Krawczyk

(57) ABSTRACT

A dynamically vulcanized alloy contains at least one isobutylene-containing elastomer, at least one thermoplastic resin, and an anhydride functionalized oligomer grafted to the thermoplastic resin. In the alloy, the elastomer is present as a dispersed phase of small vulcanized or partially vulcanized particles in a continuous phase of the thermoplastic resin and the alloy is substantially absent of any sulfonamides.

20 Claims, 1 Drawing Sheet

ELASTOMERIC COMPOSITIONS AND THEIR USE IN ARTICLES

CROSS REFERENCE TO RELATED APPLICATIONS

This application is a National Stage Application of International Application No. PCT/US2012/064645, filed Nov. 12, 2012. This application claims the benefit of prior U.S. Application Ser. No. 61/577,409, filed Dec. 19, 2011, the disclosures of which are incorporated herein by reference in their entirety.

FIELD OF THE INVENTION

The present invention relates to thermoplastic elastomeric compositions. More particularly, the present invention is directed to a thermoplastic elastomeric composition comprising compounds that act as both an extender and reactive plasticizer for the thermoplastic in the composition.

BACKGROUND OF THE INVENTION

The present invention is related to thermoplastic elastomeric compositions particularly useful for tire and other industrial rubber applications, reinforced or otherwise, that require impermeability characteristics.

EP 0 722 850 B1 discloses a low-permeability thermoplastic elastomeric composition that is excellent as an innerliner in pneumatic tires. This composition comprises a low permeability thermoplastic in which is dispersed a low permeability rubber. EP 0 969 039 A1 discloses a similar composition and teaches that the small particle size rubber dispersed in the thermoplastic was important to achieve acceptable durability of the resulting composition.

There are also examples of the use of a thermoplastic elastomer composed of a rubber and a thermoplastic for use as an innerliner in a tire. But, in general, a flexible material of the type disclosed therein has low heat resistance. When the thermoplastic material in the composition has a melting point less than the tire vulcanization temperature, when the tire curing bladder is released at the end of the curing cycle, the inside surface of the tire may have defects due to the thermoplastic material of the composition sticking to rubber of the curing bladder.

Controlling the viscosity difference between the two different materials in the composition is also considered important, as the viscosity difference affects the dispersed rubber particle size. To obtain the desired viscosity reduction, it is known to add a plasticizer to the composition. The most common plasticizer used is butylbenzylsulfonamide (BBSA). However, when using BBSA as the plasticizer, the BBSA is not bound or grafted to the thermoplastic resin in the composition and the unbound BBSA is known to volatize out during subsequent heating and downstream processing of the thermoplastic elastomer. Such volatilization of the BBSA can result in undesirable blemishes on the product surface, this is also known as 'blooming' and while not detrimental to the performance of the product, does result in an unsatisfactory appearance and an impression of a faulty product. Additionally, it is desired to reduce the amount of volatiles that are released into the atmosphere during downstream operations using the thermoplastic elastomer.

To that end, the inventors have previously sought to reduce the amount of BBSA used as a plasticizer in the thermoplastic elastomer compositions. The resulting compositions had lower BBSA volatile organic compounds and surprisingly good fluidity. The melting point of the new compositions was also higher, which is a desirable attribute. No penalties in engineering properties were incurred. However, attempts to fully eliminate the BBSA from the elastomer-rich compositions, until the present invention, were unsuccessful as the elastomer component of the composition failed to achieve the desired phase inversion and did not convert to a dispersed phase in a thermoplastic resin domain and the resulting composition was too soft. To achieve the desired phase inversion, a small level of BBSA, approximately 2.5 wt % based on the total weight of the composition, had to be present in the composition during composition mixing. The present invention is directed to addressing the desire to continue to reduce, and preferably eliminate BBSA, and in particular unbound sulfonamides, in the composition.

SUMMARY OF THE INVENTION

The present invention is directed to a thermoplastic elastomeric composition having improved characteristics over previously known similar compositions.

The present invention is directed to a dynamically vulcanized alloy containing at least one isobutylene-containing elastomer, at least one thermoplastic resin, and an anhydride functionalized oligomer grafted to the thermoplastic resin. In the alloy, the elastomer is present as a dispersed phase of small vulcanized or partially vulcanized particles in a continuous phase of the thermoplastic resin and the alloy is substantially absent of any sulfonamides.

In the invention, the oligomer may be selected from the group consisting of an alkyl, an aryl, and an alkenyl oligomer. The oligomer preferably has a molecular weight in the range of 500 to 2500.

In the invention, the anhydride functionalized oligomer is present in the alloy in an amount in the range of 2 to 30 phr, based on the amount of the isobutylene-containing elastomer in the alloy.

Also disclosed and useful in any embodiment of the present invention, the thermoplastic resin has a relative viscosity of not more than 3.9. The alloy may contain a mixture of thermoplastic resins, wherein the relative viscosities of the different thermoplastic resins are different, but wherein the relative viscosity of the mixture is not more than 3.9. Preferably, the relative viscosity of the thermoplastic resin, either as a single component or a mixture of resin, is not less than 2.0. Thermoplastic resins useful in any embodiment may be copolymers or homopolymers.

Also disclosed herein and useful in any embodiment of the present invention, the elastomer may be a halogenated butyl rubber or a polymer of isobutylene derived units and alkylstyrene derived units. The polymer of isobutylene derived units and alkylstyrene, preferably paramethylstyrene, derived units may be halogenated. In any embodiment, when the elastomer is a polymer of isobutylene derived units and alkylstyrene, the polymer comprises 7 to 12 wt % of alkylstyrene, preferably paramethylstyrene. In any embodiment, the elastomer may contain 1.0 to 1.5 mol % of a halogen; the halogen may be bromine or chlorine.

Also disclosed herein and useful in any embodiment of the present invention, the alloy is an elastomer-rich compound, wherein the elastomer is present in the alloy in an amount in the range of 55 to 90 weight percent. For such elastomer-rich compounds, the presence of the anhydride functionalized oligomer that is grafted to the thermoplastic resin works to effectively increase the amount of thermoplastic present in the alloy and enables the more dominate compound in the alloy, i.e., the elastomer, to achieve phase conversion whereby the elastomer is present in a discrete phase within a continuous phase of thermoplastic resin.

BRIEF DESCRIPTION OF THE DRAWINGS

The invention will be described by way of example and with reference to the accompanying drawing in which.

DETAILED DESCRIPTION OF THE INVENTION

Figure 1:
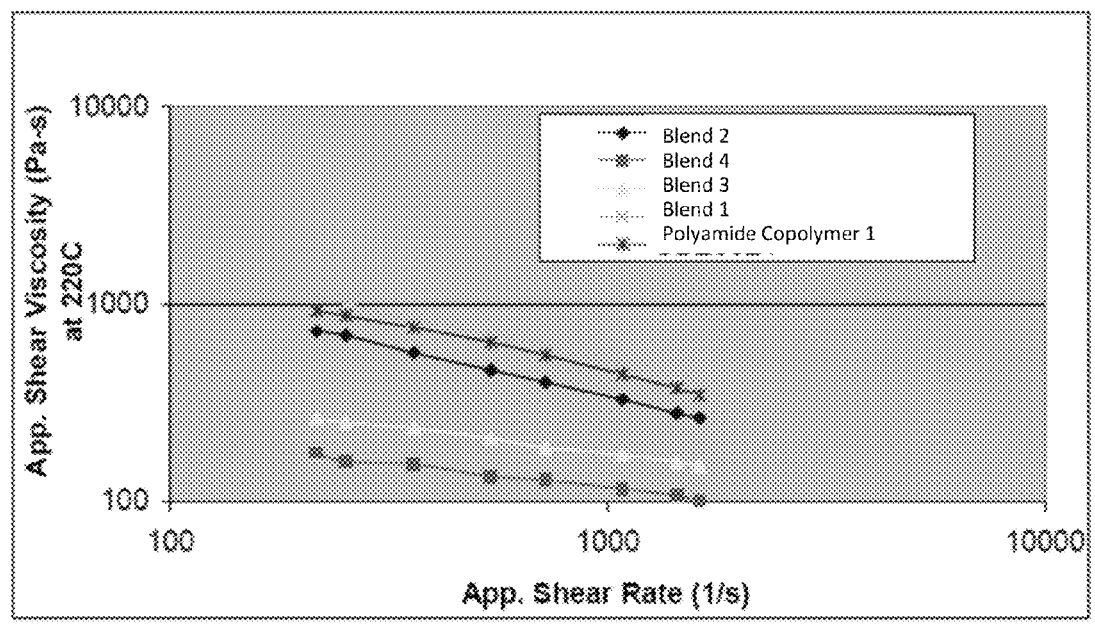
FIG. 1 is a graph showing the viscosity versus shear for binary blends of polyamides and AFOs.

The present invention is directed to thermoplastic elastomer composition that has the elastomer present in the composition as discreet domains in a thermoplastic resin matrix wherein to achieve the desired morphology, a combination of anhydrides such as polyisobutylene succinic anhydride and at least one medium viscosity thermoplastic resin, preferably polyamide, is present in the composition. This combination of additives in the composition enables the elimination of sulfonamide containing plasticizers in the thermoplastic elastomer; that is the composition is substantially free of sulfonamides wherein 'substantially free' is defined as less than 100 ppm by weight of the sulfonamide. In particular, the elimination of BBSA from the composition while still achieving the desired morphology. Additionally, in order to achieve the best balance of key performance properties; namely impermeability and low temperature fatigue we found it is preferable to use an elastomer derived from a defined amount of styrene components and optionally, with a defined halogen content.

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

DEFINITIONS

Definitions applicable to the presently described invention are as described below.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the polymerized form of a derivative from the monomer (i.e., a monomeric unit). However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

Elastomer refers to any polymer or composition of polymers consistent with the ASTM D1566 definition: "a material that is capable of recovering from large deformations, and can be, or already is, modified to a state in which it is essentially insoluble, if vulcanized, (but can swell) in a solvent." Elastomers are often also referred to as rubbers; the term elastomer may be used herein interchangeably with the term rubber.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is normally defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percentages for every component after adjusting levels of only one, or more, component(s).

Isoolefin refers to any olefin monomer having at least one carbon having two substitutions on that carbon. Multiolefin refers to any monomer having two or more double bonds. In a preferred embodiment, the multiolefin is any monomer comprising two conjugated double bonds such as a conjugated diene like isoprene.

Isobutylene based elastomer or polymer refers to elastomers or polymers comprising at least 70 mol % repeat units from isobutylene.

Elastomer

Useful elastomeric compositions for this invention include elastomers derived from a mixture of monomers, the mixture having at least (1) a $C_4$ to $C_7$ isoolefin monomer component with (2) a multiolefin, monomer component. The isoolefin is present in a range from 70 to 99.5 wt % by weight of the total monomers in any embodiment, or 85 to 99.5 wt % in any embodiment. The multiolefin derived component is present in amounts in the range of from 30 to about 0.5 wt % in any embodiment, or from 15 to 0.5 wt % in any embodiment, or from 8 to 0.5 wt % in any embodiment.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethylfulvene, hexadiene, cyclopentadiene, and piperylene. Other polymerizable monomers such as styrene and dichlorostyrene are also suitable for homopolymerization or copolymerization in butyl rubbers.

Preferred elastomers useful in the practice of this invention include isobutylene-based copolymers. As stated above, an isobutylene based elastomer or a polymer refers to an elastomer or a polymer comprising at least 70 mol % repeat units from isobutylene and at least one other polymerizable unit. The isobutylene-based copolymer may or may not be halogenated.

In any embodiment of the invention, the elastomer may be a butyl-type rubber or branched butyl-type rubber, especially halogenated versions of these elastomers. Useful elastomers are unsaturated butyl rubbers such copolymers of olefins or isoolefins and multiolefins. Non-limiting examples of unsaturated elastomers useful in the method and composition of the present invention are poly(isobutylene-co-isoprene), polyisoprene, polybutadiene, polyisobutylene, poly(styrene-co-butadiene), natural rubber, star-branched butyl rubber, and mixtures thereof. Useful elastomers in the present invention can be made by any suitable means known in the art, and the invention is not herein limited by the method of producing the elastomer. The butyl rubber polymer of the invention is obtained by reacting isobutylene with 0.5 to 8 wt % isoprene, or reacting isobutylene with 0.5 wt % to 5.0 wt % isoprene— the remaining weight percent of the polymer being derived from isobutylene.

Elastomeric compositions of the present invention may also comprise at least one random copolymer comprising a $C_4$ to $C_7$ isoolefin and an alkylstyrene comonomer. The isoolefin may be selected from any of the above listed $C_4$ to $C_7$ isoolefin monomers, and is preferably an isomonoolefin, and in any embodiment may be isobutylene. The alkylstyrene may be para-methylstyrene, containing at least 80%, more alternatively at least 90% by weight of the para-isomer. The random copolymer may optionally include functionalized interpolymers. The functionalized interpolymers have at least one or more of the alkyl substituents groups present in the styrene monomer units; the substituent group may be a benzylic halogen or some other functional group. In any embodiment, the polymer may be a random elastomeric copolymer of a $C_4$ to $C_6$ α-olefin and an alkylstyrene comonomer. The alkylstyrene comonomer may be para-methylstyrene containing at least 80%, alternatively at least 90% by weight, of the para-isomer. The random comonomer may optionally include functionalized interpolymers wherein at least one or more of the alkyl substituents groups present in the styrene monomer units contain benzylic halogen or some other functional group. Exemplary materials of any embodiment may be characterized as polymers containing the following monomer units randomly spaced along the polymer chain:

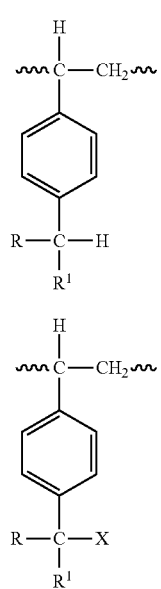

wherein R and $R^1$ are independently hydrogen, lower alkyl, such as a $C_1$ to $C_7$ alkyl and primary or secondary alkyl halides and X is a functional group such as halogen. In an embodiment, R and $R^1$ are each hydrogen. Up to 60 mol % of the para-substituted styrene present in the random polymer structure may be the functionalized structure (2) above in any embodiment. Alternatively, in any embodiment, from 0.1 to 5 mol % or 0.2 to 3 mol % of the para-substituted styrene present may be the functionalized structure (2) above.

The functional group X may be halogen or some other functional group which may be incorporated by nucleophilic substitution of any benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

In any embodiment, the elastomer comprises random polymers of isobutylene and 0.5 to 20 mol % para-methylstyrene wherein up to 60 mol % of the methyl substituent groups present on the benzyl ring is functionalized with a halogen such a bromine or chlorine, an acid, or an ester.

In any embodiment, the functionality is selected such that it can react or form polar bonds with functional groups present in the matrix polymer, for example, acid, amino or hydroxyl functional groups, when the polymer components are mixed at high temperatures.

Brominated poly(isobutylene-co-p-methylstyrene) "BIMSM" polymers useful in the present invention generally contain from 0.1 to 5 mol % of bromomethylstyrene groups relative to the total amount of monomer derived units in the copolymer. In any embodiment of the invention using BIMSM, the amount of bromomethyl groups is from 0.5 to 3.0 mol %, or from 0.3 to 2.8 mol %, or from 0.4 to 2.5 mol %, or from 0.5 to 2.0 mol %, wherein a desirable range for the present invention may be any combination of any upper limit with any lower limit. Also in accordance with the invention, the BIMSM polymer has either 1.0 to 2.0 mol % bromomethyl groups, or 1.0 to 1.5 mol % of bromomethyl groups. Expressed another way, exemplary BIMSM polymers useful in the present invention contain from 0.2 to 10 wt % of bromine, based on the weight of the polymer, or from 0.4 to 6 wt % bromine, or from 0.6 to 5.6 wt %. Useful BIMSM polymers may be substantially free of ring halogen or halogen in the polymer backbone chain. In any embodiment, the random polymer is a polymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.5 to 2.0 mol % based on the total number of para-methylstyrene, and wherein the para-methylstyrene derived units are present from 5 to 15 wt %, or 7 to 12 wt %, based on the total weight of the polymer. In any embodiment, the para-(halomethylstyrene) is para-(bromomethylstyrene).

Thermoplastic Resin

For purposes of the present invention, a thermoplastic (alternatively referred to as thermoplastic resin) is a thermoplastic polymer, copolymer, or mixture thereof having a Young's modulus of more than 200 MPa at 23° C. The resin should have a melting temperature of about 170° C. to about 260° C., preferably less than 260° C., and most preferably less than about 240° C. By conventional definition, a thermoplastic is a synthetic resin that softens when heat is applied and regains its original properties upon cooling.

Such thermoplastic resins may be used singly or in combination and generally contain nitrogen, oxygen, halogen, sulfur or other groups capable of interacting with an aromatic functional groups such as halogen or acidic groups. Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK), ethylene copolymer resins (EVA or EVOH) and mixtures thereof.

Suitable polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Commercially available polyamides may be advantageously used in the practice of this invention, with linear crystalline polyamides having a softening point or melting point between 160 and 260° C. being preferred.

Suitable polyesters which may be employed include the polymer reaction products of one or a mixture of aliphatic or aromatic polycarboxylic acids esters of anhydrides and one or a mixture of diols. Examples of satisfactory polyesters include poly(trans-1,4-cyclohexylene $C_{2-6}$ alkane dicarboxylates such as poly(trans-1,4-cyclohexylene succinate) and poly(trans-1,4-cyclohexylene adipate); poly(cis or trans-1,4-cyclohexanedimethylene)alkanedicarboxylates such as poly(cis-1,4-cyclohexanedimethylene)oxlate and poly-(cis-1,4-cyclohexanedimethylene)succinate, poly($C_{2-4}$ alkylene terephthalates) such as polyethyleneterephthalate and polytetramethylene-terephthalate, poly($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) resins which may be used in accordance with this invention are well known, commercially available materials produced by the oxidative coupling polymerization of alkyl substituted phenols. They are generally linear, amorphous polymers having a glass transition temperature in the range of 190° C. to 235° C.

Ethylene copolymer resins useful in the invention include copolymers of ethylene with unsaturated esters of lower carboxylic acids as well as the carboxylic acids per se. In particular, copolymers of ethylene with vinylacetate or alkyl acrylates for example methyl acrylate and ethyl acrylate can be employed. These ethylene copolymers typically comprise about 60 to about 99 wt % ethylene, preferably about 70 to 95 wt % ethylene, more preferably about 75 to about 90 wt % ethylene. The expression "ethylene copolymer resin" as used herein means, generally, copolymers of ethylene with unsaturated esters of lower ($C_1$-$C_4$) monocarboxylic acids and the acids themselves; e.g., acrylic acid, vinyl esters or alkyl acrylates. It is also meant to include both "EVA" and "EVOH", which refer to ethylene-vinylacetate copolymers, and their hydrolyzed counterpart ethylene-vinyl alcohols.

Thermoplastic Elastomeric Composition

At least one of any of the above elastomers and at least one of any of the above thermoplastics are blended to form a dynamically vulcanized alloy. The term "dynamic vulcanization" is used herein to connote a vulcanization process in which the vulcanizable elastomer is vulcanized in the presence of a thermoplastic under conditions of high shear and elevated temperature. As a result, the vulcanizable elastomer is simultaneously crosslinked and preferably becomes dispersed as fine sub micron size particles of a "micro gel" within the thermoplastic. The resulting material is often referred to as a dynamically vulcanized alloy ("DVA").

Dynamic vulcanization is effected by mixing the ingredients at a temperature which is at or above the curing temperature of the elastomer, and also above the melt temperature of the thermoplastic component, in equipment such as roll mills, Banbury™ mixers, continuous mixers, kneaders or mixing extruders, e.g., Buss kneaders, twin or multiple screw extruders. The unique characteristic of the dynamically cured compositions is that, notwithstanding the fact that the elastomer component may be fully cured, the compositions can be processed and reprocessed by conventional thermoplastic processing techniques such as film blowing, extrusion, injection molding, compression molding, etc. Scrap or flashing can also be salvaged and reprocessed; those skilled in the art will appreciate that conventional elastomeric thermoset scrap, comprising only elastomer polymers, cannot readily be reprocessed due to the cross-linking characteristics of the vulcanized polymer.

Preferably the thermoplastic resin may be present in an amount ranging from about 10 to 98 wt %, preferably from about 20 to 95 wt %, the elastomer may be present in an amount ranging from about 2 to 90 wt %, preferably from about 5 to 80 wt %, based on the polymer blend. For elastomeric-rich blends, the amount of thermoplastic resin in the polymer blend is in the range of 45 to 10 wt %, and the elastomer is present in the amount of 90 to 55 wt %.

The elastomer may be present in the composition in a range up to 90 wt % in any embodiment, or up to 80 wt % in any embodiment, or up to 70 wt % in any embodiment. In the invention, the elastomer may be present from at least 2 wt %, and from at least 5 wt % in another embodiment, and from at least 5 wt % in yet another embodiment, and from at least 10 wt % in yet another embodiment. A desirable embodiment may include any combination of any upper wt % limit and any lower wt % limit.

In preparing the DVA, other materials may be blended with either the elastomer or the thermoplastic, before the elastomer and the thermoplastic are combined in the blender or added to the mixer during or after the thermoplastic and elastomer have already been introduced to each other. These other materials may be added to assist with preparation of the DVA or to provide desired physical properties to the DVA. Such additional materials include, but are not limited to, curatives, compatibilizers, extenders and polyamide oligomers or low molecular weight polyamide and other lubricants as described in U.S. Pat. No. 8,021,730 B2 which is incorporated by reference.

With reference to the elastomers of the disclosed invention, "vulcanized" or "cured" refers to the chemical reaction that forms bonds or cross-links between the polymer chains of the elastomer. Curing of the elastomer is generally accomplished by the incorporation of the curing agents and/or accelerators, with the overall mixture of such agents referred to as the cure system or cure package.

Suitable curing components include sulfur, metal oxides, organometallic compounds, radical initiators. Common curatives include ZnO, CaO, MgO, Al2O3, CrO3, FeO, Fe2O3, and NiO. These metal oxides can be used alone or in conjunction with metal stearate complexes (e.g., the stearate salts of Zn, Ca, Mg, and Al), or with stearic acid or other organic acids and either a sulfur compound or an alkyl or aryl peroxide compound or diazo free radical initiators. If peroxides are used, peroxide co-agent commonly used in the art may be employed. The use of peroxide curative may be avoided if the thermoplastic resin is one such that the presence of peroxide would cause the thermoplastic resin to cross-link.

As noted, accelerants (also known as accelerators) may be added with the curative to form a cure package. Suitable curative accelerators include amines, guanidines, thioureas, thiazoles, thiurams, sulfenamides, sulfenimides, thiocarbamates, xanthates, and the like. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio)benzothiazole (MBS or MOR), compositions of 90% MOR and 10% MBTS (MOR90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

In any embodiment of the invention, at least one curing agent is typically present at about 0.1 to about 15 phr; alternatively at about 1.0 to about 10 phr, or at about 1.0 to 3.0 phr, or at about 1.0 to 2.5 phr. If only a single curing agent is used, it is preferably a metal oxide such as zinc oxide.

In an embodiment of the DVA, due to the goal of the elastomer being present as discrete particles in a thermoplastic domain, the addition of the curing components and the temperature profile of the components are adjusted to ensure the correct morphology is developed. Thus, if there are multiple mixing stages in the preparation of the DVA, the curatives may be added during an earlier stage wherein the elastomer alone is being prepared. Alternatively, the curatives may be added just before the elastomer and thermoplastic resin are combined or even after the thermoplastic has melted and been mixed with the rubber. Sub-inclusions of the thermoplastic inside the rubber particles may also be present. Although discrete rubber particle morphology in a continuous thermoplastic matrix is the preferred morphology, the invention is not limited to only this morphology and may also include morphologies where both the elastomer and the thermoplastic are continuous. But for any sub-inclusions in the elastomer, the thermoplastic resin will preferably not be discontinuous in the DVA.

Minimizing the viscosity differential between the elastomer and the thermoplastic resin components during mixing and/or processing enhances uniform mixing and fine blend morphology that significantly enhance good blend mechanical as well as desired permeability properties. However, as a consequence of the flow activation and shear thinning characteristic inherent in elastomeric polymers, reduced viscosity values of the elastomeric polymers at the elevated temperatures and shear rates encountered during mixing are much more pronounced than the reductions in viscosity of the thermoplastic component with which the elastomer is blended. It is desired to reduce this viscosity difference between the materials to achieve a DVA with acceptable elastomeric dispersion sizes.

Components previously used to compatibilize the viscosity between the elastomer and thermoplastic components include low molecular weight polyamides, maleic anhydride grafted polymers having a molecular weight on the order of 10,000 or greater, methacrylate copolymers, tertiary amines and secondary diamines. One common group of compatibilizers are maleic anhydride-grafted ethylene-ethyl acrylate copolymers (a solid rubbery material available from Mitsui-DuPont as AR-201 having a melt flow rate of 7 g/10 min measured per JIS K6710). These compounds may act to increase the 'effective' amount of thermoplastic material in the elastomeric/ thermoplastic compound. The amount of additive is selected to achieve the desired viscosity comparison without negatively affecting the characteristics of the DVA. If too much is present, impermeability may be decreased and the excess may have to be removed during post-processing. If not enough compatibilizer is present, the elastomer may not invert phases to become the dispersed phase in the thermoplastic resin matrix.

Compounds commonly referred to as plasticizers have also typically been employed as compatibilizers. As already discussed, it has been conventional in the art to use a sulfonamide, such as BBSA, as the plasticizer in the DVA. The presence of the sulfonamide has, until the present invention, been felt to be a necessary component in the composition despite any negative 'blooming' onto the final product that might occur.

In the present invention, Applicants have determined that the desired compatibility between the elastomer and thermoplastic resin may be obtained in the absence of any sulfonamides in the material, and wherein the desired properties of the DVA, in particular improved impermeability with good morphology, can be achieved by the selective use of a medium relative viscosity nylon or blends of high and medium relative viscosity nylons and/or low relatively viscosity nylons in combination with a low molecular weight anhydride functionalized oligomer (AFO). For optimum balance of durability versus processability it is desirable to minimize or even eliminate the low molecular weight nylon, i.e. those having a MW of less than 10,000. In the invention, low molecular weight nylon is present in the composition in an amount of 0 to 5 wt % of the total composition, preferably 0 to 3 wt %, more preferably 0 wt % of the total composition; expressed alternatively, the amount of low molecular weight nylon in the invention is 0 to 10 wt %, preferably 0 to 5 wt %, more preferably 0 wt %, of the total 'effective amount' of thermoplastic components in the compound.

The terminology of high, medium and low viscosity nylon is defined in terms of relative viscosity, calculated per ASTM D2857 and is the ratio of the viscosity of the solution to the viscosity of the solvent in which the polymer is dissolved, as specified in exemplary polyamides raw material useful for this invention and shown in Table 1 below.

TABLE 1

| Polyamide Grades | Comonomer Ratio PA6/ PA66, % | Relative Viscosity (1% in 96% $H_2SO_4$ at 23° C.) | Viscosity Classification | Commercial Source |
| --- | --- | --- | --- | --- |
| PA 6/66 | 85/15 | 4.1 | High | UBE 5033B |
| PA 6/66 | 80/20 | 3.4 | Medium | UBE 5024B |
| PA 6/66 | 85/15 | 2.5 | Low | UBE 5013B |
| PA 6/66 | 85/15 | 2.3 | Low | Novamid 2010 |
| PA 6/66 | 80/20 | 3.3 | Intermediate | Ultramid C33 01 |
| PA 6/66 | 80/20 | 3.1 | Intermediate | Ultramid C31 01 |
| PA 6 | 100/0 | 2.7 | Low | Ultramid B27 |
| PA 6 | 100/0 | 2.5 to 2.74 | Low | Ultramid B26 HM 01 |

When the relative viscosity is at or above 4.0, the resin has a relative viscosity classification of high. When the relative viscosity is in the range of 3.4 to 3.9, the resin has a relative viscosity classification of medium. When the relative viscosity is in the range of 2.9 to 3.3, the resin has a relative viscosity classification of intermediate and may also be classified as medium or low. For resin having a relative viscosity below 2.9, the resin has a relative viscosity classification of low, with those below 2.0 being classified as ultra low.

In any embodiment of the present invention, a thermoplastic copolymer or homopolymer having a relative viscosity lower than the primary thermoplastic component is used to aid in reduction of the viscosity of the thermoplastic during mixing of the DVA. When added, the amount of relatively lower viscosity thermoplastic is in the range of 5 to 25 percent of the total thermoplastic resin present in the composition. This results in a thermoplastic viscosity that is relatively low in comparison to the viscosity of the elastomer during mixing and/or processing. For high relative viscosity (RV) grades of thermoplastic resin, the thermoplastic resin may require a greater amount of compatibilizers in the alloy. Whether the thermoplastic component of the DVA is a single medium relative viscosity thermoplastic resin or a mixture of two or more thermoplastic resins, the thermoplastic resin, preferably polyamide, should have a relative viscosity in the range in the range of 3.9 to 2.9, preferably in the range of 3.5 to 2.9.

In accordance with the present invention, to obtain the correct morphology in elastomer-rich compositions, i.e. greater than 55 wt % elastomer in the composition, the viscosity of the thermoplastic plus the AFO should be lower than the viscosity of the elastomer. Anhydride moieties, both maleic and succinic anhydride moities, have an affinity and compatibility with the thermoplastics employed in the compositions of this invention. The anhydrides are miscible or sufficiently compatible with the thermoplastic, and, not wishing to be bound by any theory, it is believed that the anhydrides may also act as scavengers for any terminal amines in the thermoplastic, causing the anhydride to graft to the thermoplastic. As the AFO grafts with the thermoplastic resin during mixing of the DVA, the AFO is added into the mixer/extruder simultaneously with the thermoplastic resin or as the thermoplastic resin begins to melt in the mixer/extruder; if the AFO is added prior to the inclusion of the thermoplastic resin, the oligomer is simply mixed with the elastomer and does not react with the elastomer. As a result of the grafting reaction, the anhydride functionalized oligomer is fixed within the DVA, and does not volatize out like conventional plasticizers/compatibilizers during post DVA processing operations such as film blowing or tire curing. Thus, the resulting DVA has a low volatile organic compound emissions. This is believed to be most applicable when using polar thermoplastics. Furthermore, it was surprisingly found that the melting point of a polyamide thermoplastic phase is invariant when the anhydrides are used, contrary to traditional plasticizers for polyamide thermoplastics such as n-butyl benzene sulfonamides that negatively depress the melting point of the thermoplastic.

Both maleic and succinic anhydrides functionalized oligomers are useful in the present invention. The anhydride functionalized oligomer may be prepared by thermal or chloro methods known in the art of reacting an alkyl, aryl, or olefin oligomer with anhydride, preferably maleic anhydride. The oligomer of any embodiment of the invention, including copolymers of lower olefins, being reacted with the anhydride, has a molecular weight in the range of about 500 to 5000, or 500 to 2500, or 750 to 2500, or 500 to 1500. The oligomer of the invention may also have a molecular weight in the ranges of 1000 to 5000, 800 to 2500, or 750 to 1250. Specific examples of succinic anhydrides include poly-isobutylene succinic anhydride, poly-butene succinic anhydride, n-octenyl succinic anhydride, n-hexenyl succinic anhydride, and dodocenyl succinic anhydride.

The most preferred anhydride functionalized oligomers for this invention are those derived from polyisobutene and are commonly known as polyisobutylene succinic anhydride or polyisobutene succinic anhydride (PIBSA). The PIBSA may be made by cationic polymerization of isobutene with boron trifluoride as catalyst. In the course of the polymerization, high concentrations of α-olefins are formed during the transfer reaction and as a result the polymerization product has a high proportion of terminal double bonds (α-olefin). They are normally clear to amber viscous liquids and are specially optimized during the post polymerization maleitation reaction to have a low bismaleination.

The anhydride level of the AFO of the invention may vary and a preferred range is a few percent up to about 30 wt % with a preferred range of 5 to 25 wt % and a more preferred range of 7 to 17 wt % and a most preferred range of 9 to 15 wt %.

The impact on the viscosity of a thermoplastic resin by the inclusion of an AFO was studied. Binary blends of polyamide copolymer and PIBSA were blended in a twin screw extruder having an L/D ratio of 7.5/1.5 and wherein the temperature in the extruder were sufficient to melt the thermoplastic resin. The amount of PIBSA was varied. These results are set forth in Table 2 below.

TABLE 2

|  | Blend 1 | Blend 2 | Blend 3 | Blend 4 |
|---|---|---|---|---|
| Polyamide copolymer 1*, % | 100 | 95 | 90 | 87 | 84 |
| PIBSA*, % | — | 5 | 10 | 13 | 16 |
| PIBSA, as parts per 70 phr polyamide copolymer | — | 3.7 | 7.5 | 10.0 | 13.3 |
| Test Results |  |  |  |  |  |
| LCR (Pa · s) @300 (1/sec) @ 200° C. (L/D 7.5/1.5) | 817 | 926 | 622 | 241 | 157 |
| LCR (Pa · s) @300 (1/sec) @ 200° C. (L/D 30/1) | — | 1263 | 1083 | 953 | 709 |
| MOCON at 60° C. | 0.012 | 0.015 | 0.016 | — | — |
| Melt Temp, ° C. | 193 | 191 | 191 | 192 | 192 |

*see Table 4 below for material identification

Shear rates and shear viscosities were also tested for the binary blends. The results are set forth in FIG. 1. The use of only 5 wt % of PIBSA in the binary blend had only a minimal effect on the shear rate of the nylon. As the amount of PIBSA is increased, the shear viscosity versus the shear rate is reduced, indicating there will be a desirable lowering of the viscosity of the thermoplastic mixture by inclusion of the AFO to the thermoplastic during mixing of the DVA. Additionally, as seen in the Table above, the use of the AFO results in only a minimal change in the melt temperature of the polyamide.

The AFO, preferably succinic anhydride functionalized oligomers of low molecular weight, are present in the DVA in amounts ranging from a minimum amount of about 2 phr, 5 phr, 8 phr, or 10 phr to a maximum amount of 12 phr, 15 phr, 20 phr, 25 phr, or 30 phr. The range of anhydride may range from any of the above stated minimums to any of the above stated maximums, and the amount of anhydride may fall within any of the ranges.

The invention, accordingly, provides the following embodiments:
A. A dynamically vulcanized alloy comprising at least one isobutylene-containing elastomer; at least one thermoplastic resin, and an anhydride functionalized oligomer, wherein sulfonamide compounds are substantially absent from the alloy and wherein the elastomer is present as a dispersed phase of small highly vulcanized or partially vulcanized particles in a continuous phase of the thermoplastic resin;

B. The alloy of embodiment A, wherein the oligomer is selected from the group consisting of an alkyl, an aryl, and an alkenyl oligomer;

C. The alloy of embodiment A or B, wherein the oligomer has a molecular weight in the range of 500 to 2500;

D. The alloy of any preceding embodiment A to C or any combination thereof, wherein the anhydride functionality in the oligomer is either succinic anhydride or maleic anhydride;

E. The alloy of any preceding embodiment A to D or any combination thereof, wherein the anhydride functionalized oligomer is a poly-n-alkyl succinic anhydride or a poly-iso-alkyl succcinic anhydride;

F. The alloy of any preceding embodiment A to E or any combination thereof, wherein the functionalized oligomer is selected from the group consisting of poly-isobutylene succinic anhydride, polyisobutene succinic anhydride, polybutene succinic anhydride, polyisopentene succinic anhydride, polypentene succinic anhydride, polyoctenyl succinic anhydride, polyisooctenyl succinic anhydride, poly-hexenyl succinic anhydride, and poly-dodecenyl succinic anhydride;

G. The alloy of any preceding embodiment A to F or any combination thereof, wherein the alloy comprises 2 to 30 phr of the anhydride functionalized oligomer, based on the amount of the isobutylene-containing elastomer in the alloy;

H. The alloy of any preceding embodiment A to G or any combination thereof, wherein the thermoplastic resin in the alloy has a relative viscosity, as measured per ASTM D 2857, of not more than 3.0;

I. The alloy of any preceding embodiment A to H or any combination thereof, wherein the at least one thermoplastic resin is a mixture of at least two thermoplastic resins wherein the mixture has a relative viscosity of in the range of 3.9 to 2.9;

J. The alloy of embodiment I, wherein the thermoplastic resin mixture is a mixture of a thermoplastic resin copolymer and a thermoplastic resin homopolymer;

K. The alloy of embodiment J, wherein the thermoplastic resin homopolymer has a relative viscosity less than the relative viscosity of the thermoplastic resin copolymer;

L. The alloy of embodiment J or K, wherein the thermoplastic resin homopolymer has a relative viscosity value in the range of 3.3 to 2.0;

M. The alloy of any preceding embodiment A to L or any combination thereof, wherein said elastomer is a halogenated butyl rubber;

N. The alloy of any preceding embodiment A to M or any combination thereof, wherein said elastomer is a copolymer of isobutylene and an alkylstyrene;

O. The alloy of any preceding embodiment A to N or any combination thereof, wherein said elastomer is a copolymer of isobutylene and paramethylstyrene, and is optionally halogenated;

P. The alloy of any preceding embodiment A to O or any combination thereof, wherein the thermoplastic resin is selected from the group consisting of polyamides, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene vinyl acetates, ethylene vinyl alcohols, and mixtures thereof;

Q. The alloy of any preceding embodiment A to P or any combination thereof, wherein the thermoplastic resin is derived from at least one amine;

R. The alloy of any preceding embodiment A to Q or any combination thereof, wherein the elastomer is present in the alloy in an amount in the range of 55 to 90 weight percent;

S. The alloy of any preceding embodiment A to R or any combination thereof, wherein wherein the elastomer is a halogenated polymer of isobutylene and paramethylstyrene derived units, wherein the polymer comprises 7 to 12 wt % of the paramethylstyrene derived units;

T. The alloy of any preceding embodiment A to S or any combination thereof, wherein wherein the elastomer comprises 1.0 to 1.5 mol % of a halogen;

U. The alloy of any preceding embodiment A to T or any combination thereof, wherein wherein the alloy comprises 8 to 12 phr of the anhydride functionalized oligomer; and V. The alloy of any preceding embodiment A to U or any combination thereof, wherein wherein the alloy comprises 2 to 6 phr of at least one curative.

Examples

Test methods are summarized in Table 3.

When possible, standard ASTM tests were used to determine the DVA physical properties (see Table 2). Stress/strain properties (tensile strength, elongation at break, modulus values, energy to break) were measured at room temperature using an Instron™ 4204. Tensile measurements were done at ambient temperature on specimens (dog-bone shaped) width of 0.16 inches (0.41 cm) and a length of 0.75 inches (1.91 cm) length (between two tabs) were used. The thickness of the specimens varied and was measured manually by A Mahr Federal Inc. thickness gauge. The specimens were pulled at a crosshead speed of 20 inches/min. (51 cm/min.) and the stress/strain data was recorded. The average stress/strain value of at least three specimens is reported. Shore A hardness was measured at room temperature by using a Zwick Durometer after 15 seconds indentation. LCR viscosity was measured with a Dynisco™ capillary rheometer at 30/1 L/D (length/diameter) at 220° C. at 300 l/s. The melting point was measured by differential scanning calorimetry at 10°/minute.

Oxygen permeability was measured using a MOCON OxTran Model 2/61 operating under the principal of dynamic measurement of oxygen transport through a thin film. The units of measure are cc-mil/m2-day-mmHg and the value obtained may be alternatively referred to as the permeability or impermeability coefficient. Generally, the method is as follows: flat film is clamped into diffusion cells of the MOCON measuring unit; the diffusion cells are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

The extrusion surface smoothness (ESR) of a DVA is a measure of the surface smoothness of the DVA, with lower numbers indicating a smoother surface. The ESR is measured using a Surfanalizer, supplied by Federal, and measured in accordance with the manufacturer's instructions for operation. Lower numbers are also indicative of the elastomer phase being more uniformly and well-dispersed within the continuous thermoplastic resin phase.

The percent bound nylon, also referred to as percent insoluble nylon, is the amount of nylon that has reacted with the rubber to form a graft copolymer which is insoluble in a solvent such as trifluoroethanol. The percent bound nylon was determined gravimetrically after twenty-four hours Soxhlet extraction of the DVA with trifluoroethanol solvent to remove the soluble nylon, followed by forty-eight hours drying of the solid residue in vacuum at 80° C. The bound or insoluble nylon is calculated by subtraction of the soluble fraction from the total nylon in the DVA composition.

The fatigue life, also referred to as low temperature fatigue (LTF), is determined as follows: specimens are cut out using a JIS #3 die and from 1 mm thick extruded cast film of the DVA, with a total of ten specimens are tested at one time for each sample set; using a Constant Load Displacement/Strain Fatigue Tester manufactured by Ueshima Seisakusho Co., at −35° C. and 5 Hz frequency, and a total displacement of 40% for each specimen, the specimen is flexed as the cycle number is record; the test is terminated when the specimens are broken.

TABLE 3

| Parameter | Units | Test |
| --- | --- | --- |
| Physical Properties, injection molded plaques | | |
| Hardness | Shore A | ASTM D2240 |
| | Shore D | ASTM D2240 |
| Modulus 10%, 50%, 100% | MPa | ASTM D412 |
| Tensile Strength | MPa | ASTM D412 |
| Elongation at Break | % | ASTM D412 |
| LCR Viscosity | Pa · s | 30/1 L/D at 220° C. at 300 l/s |
| Melting Point | ° C. | Differential Scanning Calorimetry at 10° C./minute |
| MOCON (at 60° C.) | cc-mm/m$^2$-day-mmHg | |

Samples were prepared of both comparative DVAs and exemplary DVAs made in accordance with the present invention. The components used in the samples are identified in Table 4 below. The PIBSA form for the practice of this invention is not restricted to the examples used and other commercial offerings which are either neat or diluted in oil may also be employed, especially if the molecular weight of the starting PIBSA renders it too viscous. The PIBSAs may also be heated so they can be easily dispensed in mixing equipment and also to facilitate their incorporation and mixing.

TABLE 4

| Component | Brief Description | Commercial Source |
| --- | --- | --- |
| BIMSM 1 | Brominated para-methylstyrene-isobutylene copolymer, 5 wt % PMS, 0.75 mol % BrPMS, Mooney viscosity, ML (1 + 8) 125° C. = 45 | |
| BIMSM 2 | Brominated para-methylstyrene-isobutylene copolymer, 5 wt % PMS, 0.5 mol % BrPMS, Mooney viscosity, ML (1 + 8) 125° C. = 45 | |
| BIMSM 3 | Brominated para-methylstyrene-isobutylene copolymer, 7 wt % PMS, 1.2 mol % BrPMS, Mooney viscosity, ML (1 + 8) 125° C. = 45 | |
| Polyamide copolymer 1 | Nylon 6/66, see Table 1 for properties | UBE 5024, from UBE Chemical |
| Polyamide copolymer 2 | Nylon 6/66, see Table 1 for properties | Ultramid$^R$ C33 01 from BASF |
| Polyamide copolymer 3 | Nylon 6/66, see Table 1 for properties | Ultramid$^R$ C31 01 from BASF |
| Polyamide homopolymer 1 | Nylon 6, see Table 1 for properties | Ultramid B27 |
| Polyamide homopolymer 2 | Nylon 6, see Table 1 for properties | Ultramid B26 HM01 |
| Compatibilizer | Ethylene-acrylic ester-maleic anhydride terpolymer (EEA) | Lotader 4720 from Arkema Inc. |
| PIBSA | Polyisobutylene succinic anhydride, MW before anhydride reaction = 950, viscosity at 100° C. = 459 cSt, saponification # = 100 mg KOH/gm | PIBSA 950 from Texas Petrochemicals LP Or Dovermulse H1000 from Dover Chemical Corp. |
| Plasticizer | n-butylbenzene sulfonamide (BBSA) | Uniplex™ 214, Uniplex Chemical |

The DVA formulations are all set forth in the following tables. The DVAs were all prepared in the same manner, using a twin screw extruder mixer. Both comparative and exemplary DVA samples were tested to determine the physical characteristics. The test results are also set forth below in the following table.

The type of stabilizer used was identical for all composition and was present in the amount of 0.48 phr for all compositions. Two different curative packages were used. The first curative package, label as C1 in the tables below, consisted of 0.15 phr zinc oxide, 0.30 phr zinc stearate, and 0.65 stearic acid for a total additive amount of 1.58 phr. The second curative package, labeled as C2 in the tables below, consisted of 2.0 phr zinc oxide. For each example identified below, the DVA was prepared in the same manner, using the twin screw extruder.

TABLE 5

|  | Comp 1 | Comp 2 | 1 | 2 | 3 | 4 | 5 |
|---|---|---|---|---|---|---|---|
| All parts are in phr | | | | | | | |
| BIMSM 1 | 100.0 | 100.0 | 100.0 | 100.0 | 100.0 | 100.0 | 100.0 |
| Talc | 2.5 | 2.5 | 2.5 | 2.5 | 2.5 | 2.5 | 2.5 |
| Polyamide copolymer 1 | 63 | 63 | 56 | 56 | 56 | 60 | 56 |
| Polyamide homopolymer 1 | 0 | 0 | 14 | 14 | 14 | 15 | 14 |
| Compatibilizer | 10 | 10 | — | 10 | — | — | — |
| PIBSA | — | — | 10 | 10 | 10 | 10 | 10 |
| BBSA Plasticizer | 27 | 27 | 0 | 0 | 0 | 0 | 0 |
| Cure Package | C1 | C1 | C1 | C1 | C2 | C2 | C2 |
| Test Results | | | | | | | |
| Melt Temperature, ° C. | 176 | 176 | 210 | 211 | 210 | 206 | 208 |
| Shore A Hardness | 85 | 85 | 95 | 92 | 92 | 96 | 95 |
| 100% modulus, MPa | 5.91 | 5.36 | 9.77 | 7.83 | 10.59 | 11.31 | 11.06 |
| ultimate tensile strength, MPa | 15.88 | 13.59 | 12.44 | 8.71 | 13.43 | 13.73 | 13.64 |
| Elongation at Break, % | 416 | 390 | 223 | 160 | 203 | 209 | 206 |
| LCR Viscosity (Pa – s) @ 300 (1/s) @220° C., (L/D 30/1) | Not measured | 711 | 1120 | 940 | 1386 | 1323 | 1470 |
| MOCON at 60° C. | 0.11 | 0.11 | 0.23 | 0.34 | 0.22 | 0.22 | 0.27 |

For samples 1 to 3 and 5, the total amount of thermoplastic resin is 70 phr with sample 4 having a total amount of thermoplastic resin is 75 phr. All the samples have an 80/20 ratio between the medium relative viscosity thermoplastic resin and the low relative viscosity thermoplastic resin. With the exemplary resins used in these samples, the mixture has a relative viscosity of approximately 3.26 and thus the mixture has a relative viscosity classification of intermediate, and is within the desired range for the invention of not more than 3.9.

For samples 1 to 5, the melt temperature, Shore A hardness, and 100% modulus values increased due to the removal of the sulfonamide containing plasticizer and the inclusion of the AFO. As already noted, the increase in these values is deemed to actually be beneficial to the alloy to assist in further downstream processing and shaping of the alloy. The MOCON permeability coefficient is also increased over the comparative compositions, but is within the desired range of less than 0.65. For sample 2, when the compatibilizer is added to the mixture, the MOCON value increases relative to when it is absent in the AFO containing compounds.

A second set of samples were prepared, wherein the total amount of thermoplastic resin was increased to 90 phr for each sample, with an 80/20 ratio maintained between the two thermoplastic resins, and the amount of AFO, using exemplary PIBSA, was gradually increased to determine the effect. The composition and test results are set forth in Table 6 below. For examples 6 to 10, cure package C2 was used.

TABLE 6

| All parts are in phr | 6 | 7 | 8 | 9 | 10 |
|---|---|---|---|---|---|
| BIMSM 1 | 100.0 | 100.0 | 100.0 | 100.0 | 100.0 |
| Talc | 2.5 | 2.5 | 2.5 | 2.5 | 2.5 |
| Polyamide copolymer 1 | 72 | 72 | 72 | 72 | 72 |
| Polyamide homopolymer 1 | 18 | 18 | 18 | 18 | 18 |
| Compatibilizer | 0 | 0 | 0 | 0 | 0 |
| PIBSA | 10 | 12.5 | 15 | 17.5 | 20 |
| BBSA Plasticizer | 0 | 0 | 0 | 0 | 0 |
| Test Results | | | | | |
| Melt Temperature, ° C. | 210 | 209 | 210 | 210 | 209 |
| Shore D/A Hardness | 48D | 47D | 46D | 43D | 98A |
| 100% modulus, MPa | 13.61 | 13.66 | 12.99 | 12.43 | 11.82 |
| Ultimate tensile strength, MPa | 15.40 | 15.08 | 14.35 | 14.06 | 12.82 |
| Elongation at Break, % | 214 | 193 | 186 | 187 | 169 |
| LCR Viscosity (Pa-s) @ 300(1/s) @220° C., (L/D 30/1) | 1412 | 820 | 965 | 1579 | 1180 |
| MOCON at 60° C. | 0.096 | 0.096 | 0.125 | 0.173 | 0.175 |
| Fatigue Life at −30° C. (kc) | 210 | 314 | 210 | — | 271 |

It should be noted that the Shore Hardness values for samples 6 to 9 are Shore D values, versus the Shore A hardness values reported for samples 1 to 5 and 10. It is known in the art that the Shore A scale is used for 'softer' rubbers while the Shore D scale is used for 'harder' rubbers. Shore A and Shore D values do not correlate well, but for a given elastomeric compound, the Shore A value will typically be higher than the Shore D value, and elastomeric compounds having Shore A values in the range of 80 to 90 typically correspond to having Shore D values in the range of about 28 to about 37. All of the sample compounds have Shore hardness values greater than the control compounds.

Also evident from the data in the Table 6 is that the DVA has a higher melt temperature (Tc). The higher Tc can be used to advantage in subsequent processing operations such as film blowing and tire molding since a faster solidification at higher temperature enables reduction of cycle times.

Figure 2:
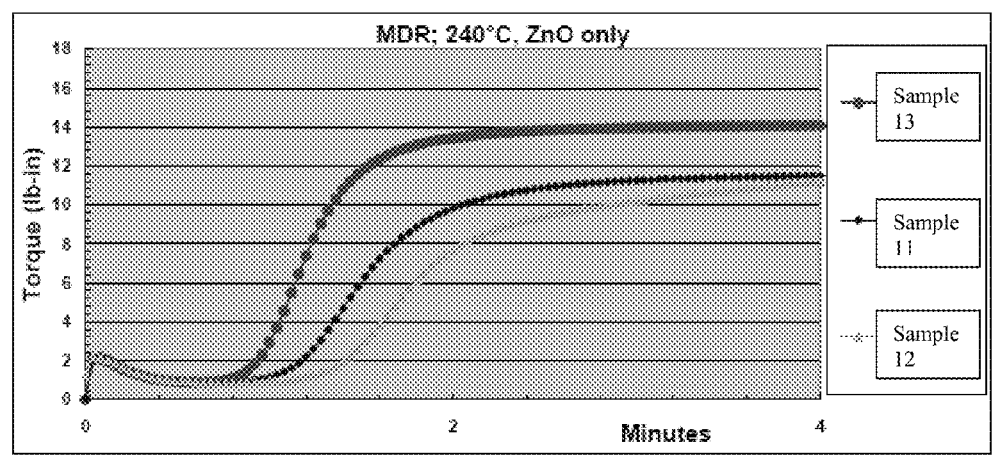
FIG. 2 is a graph showing the elastic MDR torque vs. cure times of disclosed compounds at an elevated temperature of 240° C.

The inclusion of an AFO in the DVA in place of the non-grafting sulfonamide compounds, in combination with a lower viscosity thermoplastic, is a suitable plasticizer and viscosity modifier for the DVA. Additionally, the AFO does not negatively impact the melt temperature of the DVA, and thus is beneficial in film processing of the DVA and any downstream use of the film in finished curable articles such as tires and hoses.

only material being cured when the DVS is mixed, the torque versus time properties of the elastomer alone, as presented in FIG. 2, is indicative of how cure is progressing in an extruder during DVA synthesis.

In comparing sample 13 to sample 14, the impermeability coefficient of the alloy is reduced by 25% by the use of a polyamide homopolymer having a lower relative viscosity.

Further samples were prepared to determine the effect of varying the cure additive in the PIBSA extended compound. The composition and data are set forth below in Table 8.

TABLE 8

|  | 15 | 16 | 17 | 18 | 19 | 20 | 21 |
|---|---|---|---|---|---|---|---|
| All parts are in phr |  |  |  |  |  |  |  |
| BIMSM 1 | 100 | 100 | 100 | 100 | 100 | 100 | 100 |
| Talc | 2.5 | 2.5 | 2.5 | 2.5 | 2.5 | 2.5 | 2.5 |
| Polyamide copolymer 1 | 56 | 56 | 56 | 56 | 60 | 60 | 60 |
| Polyamide homopolymer 2 | 14 | 14 | 14 | 14 | 15 | 15 | 15 |
| PIBSA | 10 | 10 | 10 | 10 | 10 | 10 | 10 |
| Zinc Oxide | 1 | 2 | 4 | 6 | 1 | 2 | 4 |
| Test Results |  |  |  |  |  |  |  |
| MOCON at 60° C. | 0.209 | 0.19 | 0.174 | 0.175 | 0.178 | 0.16 | 0.148 |
| LTF (1,000 cycles) | 30 | — | 302 | 310 | 66 | — | 250 |

As the DVAs of the invention will be used as an air barrier layer, the impermeability characteristics are also important, and should be maintained at favorable values when seeking the desired morphology of the elastomer and thermoplastic resin. Additional samples were prepared to further improve the impermeability characteristics of the material. These compositions and properties are set forth in Table 7 below.

TABLE 7

| All parts are in phr | 11 | 12 | 13 | 14 |
|---|---|---|---|---|
| BIMSM 1 | 100.0 |  |  |  |
| BIMSM 2 |  | 100 |  |  |
| BIMSM 3 |  |  | 100 | 100 |
| Talc | 2.5 | 2.5 | 2.5 | 2.5 |
| Polyamide copolymer 1 | 56 | 56 | 56 |  |
| Polyamide copolymer 2 |  |  |  | 56 |
| Polyamide homopolymer 1 | 14 | 14 | 14 |  |
| Polyamide homopolymer 2 |  |  |  | 14 |
| PIBSA | 10 | 10 | 10 | 10 |
| Zinc Oxide | 2 | 2 | 2 | 2 |
| Test Results |  |  |  |  |
| Bound Nylon, % | 6.46 | 3.52 | 5.96 | 7.78 |
| ESR | 61 | 66 | 24 | 29 |
| LCR Viscosity (Pa-s) @ 300(1/s) @220° C., (L/D 30/1) | 1240 | 877 | 1219 | 1230 |
| MOCON at 60° C. | 0.27 | 0.28 | 0.16 | 0.10 |

Torque versus time was measured for the elastomer used in samples 11 to 13 to show the cure properties of the elastomer, see FIG. 2. As seen in FIG. 2, for BIMSM 3 once cure has begun, the time to reach 'fully' cured is approximately one minute ('fully' cured being indicated by the relatively horizontal line on the graph) and has a higher degree of cure than the other two samples. This increased degree of cure assists in ensuring that alloy is fully cured when it exits the manufacturing line. While BIMSM 3 does not have more bound nylon than BIMSM 1 and 2, it does have a lower ESR and an improved impermeability coefficient. As the elastomer is the As seen in the data of Table 8, an increase in the amount of curative decreases the MOCON permeability coefficient while favorably also increasing the LTF values.

DVAs in accordance with the present invention have a MOCON permeability coefficient, measured at 60° C., of not more than 0.65 cc-mm/m$^2$-day-mmHg, preferably not more than 0.50 cc-mm/m$^2$-day-mmHg, or preferably not more than 0.30 cc-mm/m$^2$-day-mmHg. In any of the embodiments of the invention, the MOCON permeability coefficient, measured at 60° C., is not more than 0.20 cc-mm/m$^2$-day-mmHg, and is preferably in the range of 0.30 to 0.10. As evident from the data above, the compositions of the present invention have a very low permeability coefficient, well within the desired range for an air barrier material.

The inventive compositions can be used to make any number of articles. In one embodiment, the article is selected from tire curing bladders, tire innerliners, tire innertubes, and air sleeves. In another embodiment, the article is a hose or a hose component in multilayer hoses, such as those that contain polyamide as one of the component layers. Other useful goods that can be made using compositions of the invention include air spring bladders, seals, molded goods, cable housing, and other articles disclosed in THE VANDERBILT RUBBER HANDBOOK, P 637-772 (Ohm, ed., R.T. Vanderbilt Company, Inc. 1990).

What is claimed is:

1. A dynamically vulcanized alloy comprising:
   a) at least one isobutylene-containing elastomer;
   b) a mixture of at least two thermoplastic resins, the mixture having a relative viscosity in the range of 3.9 to 2.9; and
   c) 2 to 30 phr of an anhydride functionalized oligomer which is grafted to at least one of the thermoplastic resins in the mixture,
wherein sulfonamides are absent from the alloy and the elastomer is present as a dispersed phase of small vulcanized or partially vulcanized particles in a continuous phase of the thermoplastic resin mixture.

2. The alloy of claim 1, wherein the oligomer is selected from the group consisting of an alkyl derived, an aryl derived, and an alkenyl derived oligomer.

3. The alloy of claim 1, wherein the oligomer, prior to being anhydride functionalized, has a molecular weight in the range of 500 to 2500.

4. The alloy of claim 1, wherein the anhydride functionality is either a succinic anhydride or a maleic anhydride.

5. The alloy of claim 1, wherein the anhydride functionalized oligomer is a poly-n-alkyl succinic anhydride or a poly-iso-alkyl succcinic anhydride.

6. The alloy of claim 1, wherein the functionalized oligomer is selected from the group consisting of poly-isobutylene succinic anhydride, polyisobutene succinic anhydride, polybutene succinic anhydride, polyisopentene succinic anhydride, polypentene succinic anhydride, polyoctenyl succinic anhydride, polyisooctenyl succinic anhydride, poly-hexenyl succinic anhydride, and poly-dodecenyl succinic anhydride.

7. The alloy of claim 1, wherein the thermoplastic resin mixture is a mixture of a thermoplastic resin copolymer and a thermoplastic resin homopolymer.

8. The alloy of claim 7, wherein the thermoplastic resin homopolymer has a relative viscosity less than the relative viscosity of the thermoplastic resin copolymer.

9. The alloy of claim 7, wherein the thermoplastic resin homopolymer has a relative viscosity value in the range of 3.3 to 2.0.

10. The alloy of claim 1, wherein the elastomer is a halogenated butyl rubber or is a copolymer of isobutylene derived units and alkylstyrene derived units.

11. The alloy of claim 1, wherein the elastomer is a copolymer of isobutylene and paramethylstyrene derived units, and is optionally halogenated.

12. The alloy of claim 1, wherein the thermoplastic resins of the mixture are selected from the group consisting of polyamides, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene vinyl acetates, and ethylene vinyl alcohols.

13. The alloy of claim 1, wherein at least one of the thermoplastic resin is derived from at least one amine.

14. The alloy of claim 1, wherein the at least one isobutylene-containing elastomer is present in the alloy in an amount in the range of 55 to 90 weight percent of the alloy.

15. The alloy of claim 14, wherein the alloy comprises 8 to 12 phr of the anhydride functionalized oligomer.

16. The alloy of claim 14, wherein the alloy comprises 2 to 6 phr of at least one curative.

17. The alloy of claim 1, wherein the at least one isobutylene-containing elastomer is a halogenated polymer of isobutylene and paramethylstyrene derived units, wherein the polymer comprises 7 to 12 wt % of the paramethylstyrene derived units.

18. The alloy of claim 1, wherein the at least one isobutylene-containing elastomer comprises 1.0 to 1.5 mol % of a halogen.

19. The alloy of claim 1, wherein the alloy consists essentially of:
a) the at least one isobutylene-containing elastomer,
b) the mixture of at least two thermoplastic resins,
c) the anhydride functionalized oligomer grafted to the thermoplastic resin wherein the anhydride functionalized oligomer, prior to being functionalized, has a molecular weight in the range of 500 to 2500,
d) a curative package, and
e) a stabilizer package.

20. A process of preparing a dynamically vulcanized alloy, the process comprising the following steps:
a) selecting at least one at least one isobutylene-containing elastomer;
b) selecting at least one polyamide or a mixture of polyamides, wherein the at least one polyamide or mixture of polyamides has a relative viscosity of not more than 3.9 and the at least one polyamide or the mixture of polyamides excludes a polyamide having a molecular weight less than 10,000,
c) selecting a compatibilizer of an anhydride functionalized oligomer wherein the oligomer, prior to anhydride functionalized has a molecular weight in the range of 500 to 2500,
d) mixing the at least one isobutylene-containing elastomer, the at least one polyamide or a mixture of polyamides, and the compatibilizer wherein the compatibilizer is grafted to the polyamide during the mixing, and
e) continuing to mix the at least one isobutylene-containing elastomer, the at least one polyamide or a mixture of polyamides, and the compatibilizer under conditions of high shear and elevated temperature to vulcanize the elastomer and disperse the vulcanized elastomer as discrete particles in a polyamide domain; and
f) obtaining a dynamically vulcanized alloy,
wherein no sulfonamides have been introduced into the dynamically vulcanized alloy during the selecting of a) the at least one at least one isobutylene-containing elastomer, b) the at least one polyamide or the mixture of polyamides, and c) the compatibilizer, or during either mixing step.

* * * * *